United States Patent [19]

Sparling et al.

[11] Patent Number: 4,678,384
[45] Date of Patent: Jul. 7, 1987

[54] CONTROLLED EXPANSION BLIND FASTENER DESIGN

[75] Inventors: Kenneth P. Sparling; David G. Richardson, both of Burbank; Angelo Incardona, Huntington Beach; Ronald E. Wood, Sepulveda; Garth D. Kikendall, Highland Park; Leon Bakow, Sherm Oaks, all of Calif.

[73] Assignee: Lockheed Corporation, Calabasas, Calif.

[21] Appl. No.: 873,927

[22] Filed: Jun. 13, 1986

[51] Int. Cl.$^4$ ............................................. F16B 13/04
[52] U.S. Cl. ........................................ 411/43; 411/45; 411/69
[58] Field of Search ............... 411/34, 35, 36, 37, 411/38, 43, 45, 64, 70

[56] References Cited

U.S. PATENT DOCUMENTS

| | | | |
|---|---|---|---|
| 2,061,629 | 11/1936 | Huck | 411/34 |
| 2,114,493 | 4/1938 | Huck | 411/34 X |
| 2,466,811 | 4/1949 | Huck | 411/34 X |
| 2,531,270 | 11/1950 | Hood | 411/43 |
| 2,538,623 | 1/1951 | Keating | 411/43 |
| 3,377,907 | 4/1968 | Hurd | 411/40 |
| 3,937,123 | 2/1976 | Matuschek et al. | |
| 3,941,027 | 3/1976 | Gibson et al. | 411/43 |
| 4,012,984 | 3/1977 | Matuschek . | |
| 4,127,345 | 11/1978 | Angelosanto et al. | 403/388 |
| 4,143,580 | 3/1979 | Luhm . | |
| 4,177,710 | 12/1979 | Matuschek et al. . | |
| 4,219,924 | 9/1980 | Luhm | 29/512 |
| 4,230,017 | 10/1980 | Angelosanto . | |
| 4,246,828 | 1/1981 | Tamashiro | 411/45 |
| 4,364,697 | 12/1982 | Binns | 411/38 |
| 4,407,619 | 10/1983 | Siebol | 411/43 |
| 4,432,679 | 2/1984 | Angelosanto et al. | 411/34 |
| 4,451,189 | 5/1984 | Pratt | 411/34 |
| 4,587,829 | 5/1986 | Sukharvsky | 72/391 |

*Primary Examiner*—Thomas J. Holko
*Attorney, Agent, or Firm*—Louis L. Dachs

[57] ABSTRACT

The invention is a blind fastener of the type having a hollow sleeve, spindle, and locking collar. The fastener differs from conventional blind fasteners in that the spindle has a cold work mandrel portion between the pull stem and shear pin portions thereof. Furthermore, all the principle dimensions and tolerances thereof are based on the sleeve shank outer diameter. The more important dimensions are the sleeve inside diameter of between 0.9000 times the minimum sleeve outer diameter and 0.8964 times the maximum sleeve outer diameter, the shear pin diameter of the spindle is between 0.9632 times the minimum sleeve outer diameter and 0.9534 times the maximum sleeve outer diameter and the tapered cold work mandrel portion larger diameter is between 0.9684 times the minimum sleeve shank outer diameter and 0.9585 times the maximum sleeve outer diameter.

5 Claims, 6 Drawing Figures

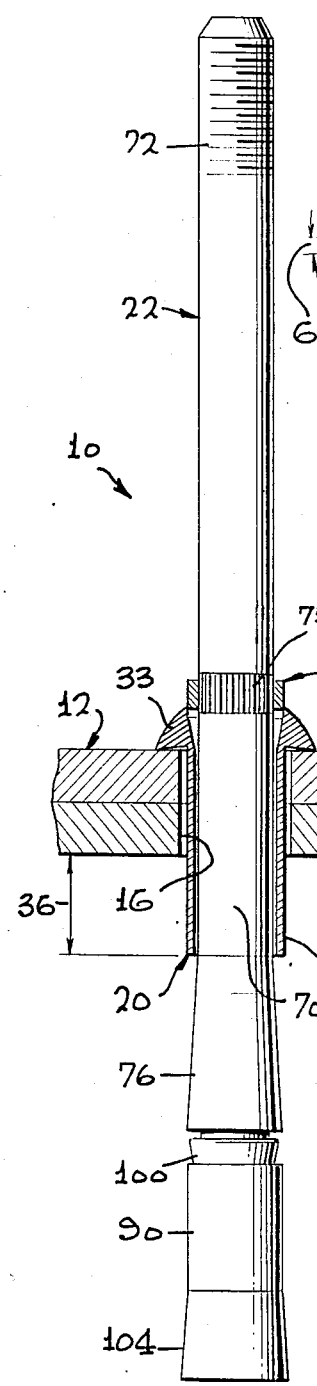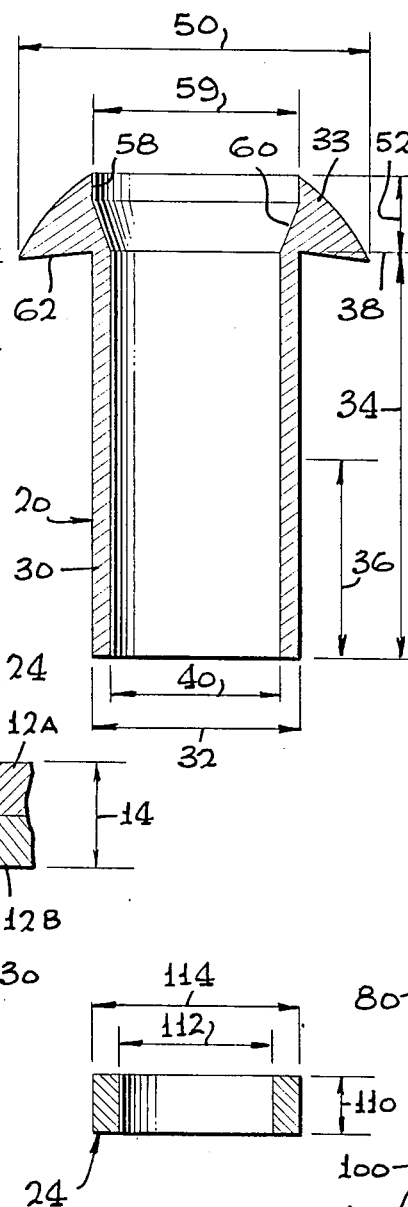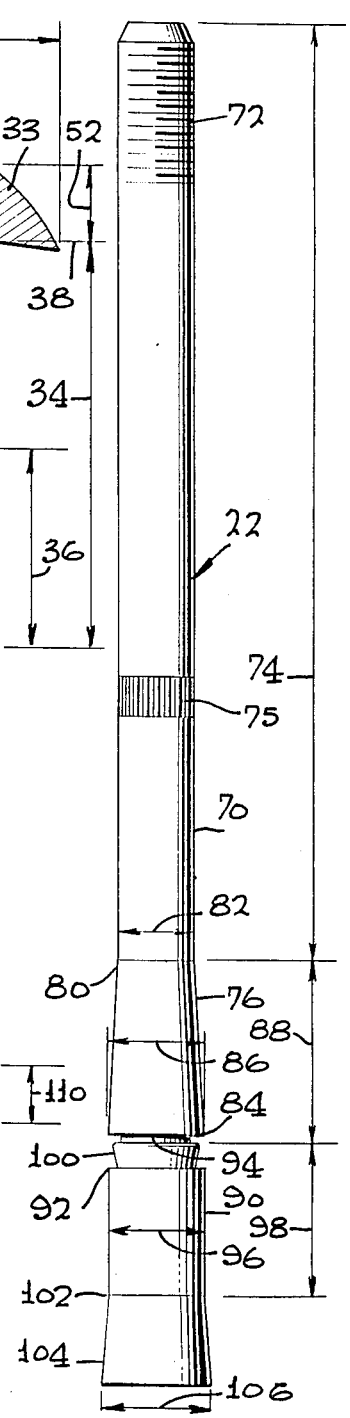

CONTROLLED EXPANSION BLIND FASTENER DESIGN

TECHNICAL FIELD

The invention relates to the field of fasteners and, in particular, a blind fastener design which provides controlled expansion of the hole when installed, increasing the fatigue life of the structure being joined.

BACKGROUND INFORMATION

Solid rivets are probably the oldest and most widely used fasteners in the industry. They are inexpensive to manufacture, do not require close tolerance holes, and they are easily installed. Riveted structures usually have an extended service (fatigue) life because of the hole-filling characteristics of the rivet. When rivets are driven, the rivet shank expands and tends to fill the hole. This eliminates relative movement between the joined structural members, thus, providing an extended fatigue life.

Blind rivets are designed to be installed from one side of the structure being joined. Thus, they are used where access from the opposite side, for positioning the bucking bar, is difficult or impossible to accomplish. While the blind rivet may be more expensive to manufacture, they can be rapidly installed by only one person using relatively inexpensive hand held machines. A typical blind fastener made to NAS1398 or 1399 standards is the Cherry Lock ® manufactured by Cherry Aerospace Fasteners, a Division of Textron Incorporated. Rivets of this type consist of a hollow sleeve, a spindle moveably mounted therein, and a locking collar. The spindle consists of a stem for gripping by the installation tool in frangible attachment to a shear pin portion. A mandrel for upsetting the end of the sleeve for locking the rivet in place is attached to the opposite end of the shear pin portion. The sleeve incorporates a head, which may be a portruding or flush-head type, and the opposite end protrudes from the other side of the structures being pinned. The locking collar is moveably mounted on the stem. The rivet is installed by placing the above-described assembly in a hole in the structures to be joined. The tool is used to hold the sleeve in the hole and simultaneously pull the stem upward. This causes the shear pin portion to slide up through the sleeve and, thereafter, the mandrel portion to deform the end of the sleeve extending out the other side of the structure. This will lock the sleeve in place. Simultaneously, a groove on the shear pin portion becomes aligned with a groove or slot in the head of the sleeve and the locking collar is wedged therein by the tool locking the shear pin portion in place. Thereafter, continued pulling on the stem causes it to separate from the shear pin portion. Examples of this design and others can be found in the following patents: U.S. Pat. No. 4,407,619, Blind Fastener with Deformable Clamping Means, G. Siebol; U.S. Pat. No. 4,364,697, Blind Fastener Assembly, L. S. Binns; U.S. Pat. No. 4,230,017, Pull-Type Blind Fastener Construction, D. J. Angelosanto; U.S. Pat. No. 4,219,924, Process for Installing Lock Spindle Blind Rivet, R. R. Luhm; U.S. Pat. No. 4,143,580, Lock Spindle Blind Rivet, R. R. Luhm; U.S. Pat. No. 4,451,189, Bulb Rivet, J. D. Pratt; U.S. Pat. No. 4,432,679, Lock Spindle Blind Fastener for Single Action Application, D. J. Angelosanto, et al.; U.S. Pat. No. 4,246,828, Blind Fastener, E. K. Tamashiro; U.S. Pat. No. 4,177,710, Blind Fastener, J. Matuschek; U.S. Pat. No. 4,127,345, Lock Spindle Blind Fastener for Single Action Application D. J. Angelosanto, et al. However, such blind fasteners are not noted for their fatigue life.

Pins installed with an interference fit, which put residual hoop tension stresses around the hole, are used to enhance the fatigue life of structures. These pins are expensive and require very close tolerance holes (after requiring reaming) and, therefore, are expensive to install One such fastener is the Hi-Tigue pin, manufactured by the Hi-Shear Corporation, Torrance, Calif. This pin used a small integral spherical shaped ring near the threaded end to cold work the hole.

It would be more desirable to place residual hoop compression stresses around the hole. One technique to accomplish this, which has been developed by the Fatigue Technology Corporation, Seattle, Wash., is to expand the hole with a removable sleeve and mandrel. The mandrel, while it is being pulled through the hole, stresses the material around the hole beyond the proportional limit in hoop tension. Thus, when the mandrel is removed, the material around the hole recovers elastically and forms residual hoop compression locally around the hole.

Applicants have developed solid protruding-head and flush-head rivet designs which are, disclosed in co-pending patent applications: Ser. No. 657,300 Controlled Expansion Flush-Head Rivet Design and Method of Installing Same, Ser. No. 657,700 Controlled Expansion Protruding-Head Rivet and Method for Installing Same, Ser. No. 803,749 Shaped Tail for Hold Expanding Rivet, and Ser. No. 676,464 Controlled Expansion Flush-Head Rivet Design and Method of Installing Same. This controlled expansion concept is not believed to have been previously applied to a blind rivet.

Further, in none of the above discussed blind rivets has an attempt been made to make all critical dimensions of the sleeve, spindle, and locking collar a function of the sleeve outer diameter. While in most cases standard rivet sizes will suffice, there are instances where special diameters (switching from inch to metric sizes, etc.) are required. Thus, a rivet having all the critical dimensions based on the shank diameter would be advantageous, since design and test time required to insure necessary static tension, shear strength, and fatigue life would be reduced to a minimum.

It must be noted however that, solid rivet designs have been previously proposed. For example, in the winter 1962/63 in Advanced Fastener Applications Engineering there is an article titled, "The Real Strength of Rivets" wherein a protruding-head rivet design is proposed having several of the dimensions thereof based on ratios of the shank diameter. These ratios are not keyed to the minimum and maximum shank diameters. Applicants, in their previously mentioned co-pending patent applications Ser. Nos. 657,300, 657,700, and 676,464 solid rivet designs, in addition to having the controlled expansion, have all their critical dimensions based on ratios of the minimum and maximum allowable shank diameter i.e., the dimension ranges are between an X value times the minimum shank diameter of the rivet and a Y value times the maximum shank diameter. Thus, the tolerance of all the critical dimensions of the rivets are defined. The ratios X and Y are selected to provide the contolled expansion.

Therefore, it is a primary object to provide a blind fastener that, when driven, obtains controlled expansion of the hole, placing residual hoop compression stresses in the hole wall and thereby increasing the fatigue life.

It is another primary object of the subject invention to provide a blind fastener wherein all critical dimensions thereof are ratios of the sleeve shank outer diameter.

A further object of the subject invention is to provide a blind fastener wherein controlled expansion of the hole is accomplished by use of a cold working mandrel frangibly attached to the shear pin portion of the spindle.

A still further object of the subject invention is to produce a blind fastener that can be installed and driven in holes produced with standard twist drills.

An additional object of the subject invention is to provide a blind rivet that can be installed with standard tools.

DISCLOSURE OF INVENTION

The invention is a blind fastener for joining adjacent structural elements, such as plates or sheet metal, together when installed in an aligned hole in the structural elements and then pulled. The blind fastener comprises a hollow tubular sleeve which includes a shank portion for inserting into the hole, a head portion for abutting against one side of the structural elements and an opposite end for extending beyond the other side of the structural elements. The fastener further includes a spindle having the following portions: (1) a stem portion having a diameter equal to or less than the inner diameter of the sleeve for pulling the spindle partially through the sleeve; (2) a mandrel portion having first and second ends with the first end attached to the stem portion. The mandrel portion increases in taper from the first to the second end and is for expanding the sleeve when it is drawn through the inner diameter thereof; (3) a shear pin portion having first and second ends with the first end flangibly attached to the second end of the mandrel portion. The shear pin portion has a diameter smaller than the second end of the mandrel and larger than the inner diameter of the sleeve; and, (4) a sleeve expanding mandrel portion attached to the second end of the shear pin portion and is adapted for expanding the opposite ends of the sleeve when the spindle is partially drawn through the inner diameter thereof.

Additionally, the fastener incorporates a locking means for locking the shear pin portion to the sleeve when the sleeve has been drawn partially through. The preferred locking means for the spindle is a locking collar moveably mounted to the stem portion. The top of the shear pin portion incorporates a groove tapered inward from the top thereof. Furthermore, the head end of the sleeve has the inner diameter counterbored to a diameter adapted to receive the locking collar. A tapered surface extends from the groove and blends into the inner diameter of the sleeve.

The fastener is installed by conventional installation tools that are well known in the art. When this tool is used the spindle is pulled upward by grasping the stem portion. Simultaneously, the head of the sleeve is pressed toward the structural elements. This draws the mandrel portion upward through the inner diameter of the sleeve causing the shank portion to expand in the hole. The dimensions of the sleeve inner diameter, cold working mandrel portion and hole are such that the hole is stressed beyond the proportional limit in hoop tension and when the mandrel portion exits the inner diameter of the sleeve the material around the hole partially recovers elastically and forms residual hoop compression locally around the hole. The continued pulled of the stem portion pulls the shear pin portion into the sleeve inner diameter so that the sleeve becomes fully supported by the shear pin portion. As this is accomplished, the upset mandrel portion engages the other end of the sleeve outwardly deforming it. Since the upset mandrel portion is larger than the inner diameter of the sleeve it will wedge the end of the sleeve against the other side of the structural elements. At this point, the locking collar is driven downward into the recess formed by the tapered groove in the shear pin portion of the spindle and the counter bore and tapered surface in the head of the sleeve. Thereafter, continued pulling will now cause the stem to separate from the shear pin portion.

The critical dimensions are: (1) the inner diameter of the sleeve is between 0.9000 times the minimum sleeve outer diameter and 0.8964 times the maximum sleeve outer diameter; (2) the diameter of the first and second ends of the cold work mandrel portion of the spindle are between 0.8789 times the minimum sleeve outer diameter and 0.8756 times the maximum sleeve outer diameter, and between 0.9684 times the minimum sleeve outer diameter and 0.9585 times the maximum sleeve outer diameter, respectively; (3) the length of the mandrel portion is between 2.000 times the minimum sleeve outer diameter and 2.1000 times the maximum sleeve outer diameter; (4) the diameter of the shear pin portion of the spindle is between 0.9632 times the minimum sleeve outer diameter and 0.9534 times the maximum sleeve outer diameter; (5) the height of the head portion is between 0.4211 times the minimum sleeve outer diameter and 0.4663 times the maximum sleeve outer diameter; (6) the diameter of the head portion is between 1.8732 times the minimum sleeve outer diameter and 1.8808 times the maximum sleeve outer diameter; and (7) the hole diameter is between the maximum sleeve outer diameter and 1.0155 times the maximum sleeve outer diameter.

The rivet can be either a protruding-head or a flush-head type. If it is a protruding-head type rivet the underside of the head should have a downward angle of between 5 and 6 degrees from the plane formed by the junction of the shank portion and head portion of the sleeve. If the fastener is a flush-head type the hole should be counter sunk at an angle of between 99 and 101 degrees and the underside tapered surface of the head should be between 102 and 103 degrees.

The novel features which are believed to be characteristic to the invention, both as to its organization and method of operation, together with further objects and advantages thereof, will be better understood from the following description connected with the accompanying drawings in which presently preferred embodiments of the invention are illustrated by way of examples. It is to be expressly understood, however, that the drawings are for purposes of illustration and description only and are not intended as a definition of the limits of the invention.

Brief Description of the Drawings

Illustrated in FIG. 1 is a cross-sectional view of the assembled protruding-head blind fastener version installed in a structure prior to upsetting.

Illustrated in FIG. 2 is a cross-sectional view of the sleeve member of the fastener shown in FIG. 1.

Illustrated in FIG. 3 is a cross-sectional view of the spindle member of the fastener shown in FIG. 1.

Illustrated in FIG. 4 is a cross-sectional view of the locking collar shown in FIG. 1.

Figure 5:
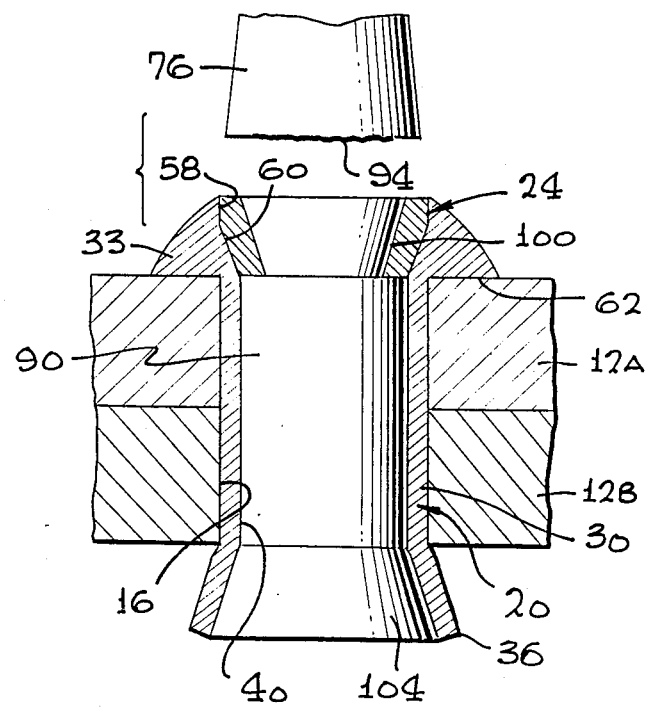

Illustrated in FIG. 5 is a cross-sectional view of the protruding-head fastener design shown in FIG. 1 installed and upset.

Figure 6:
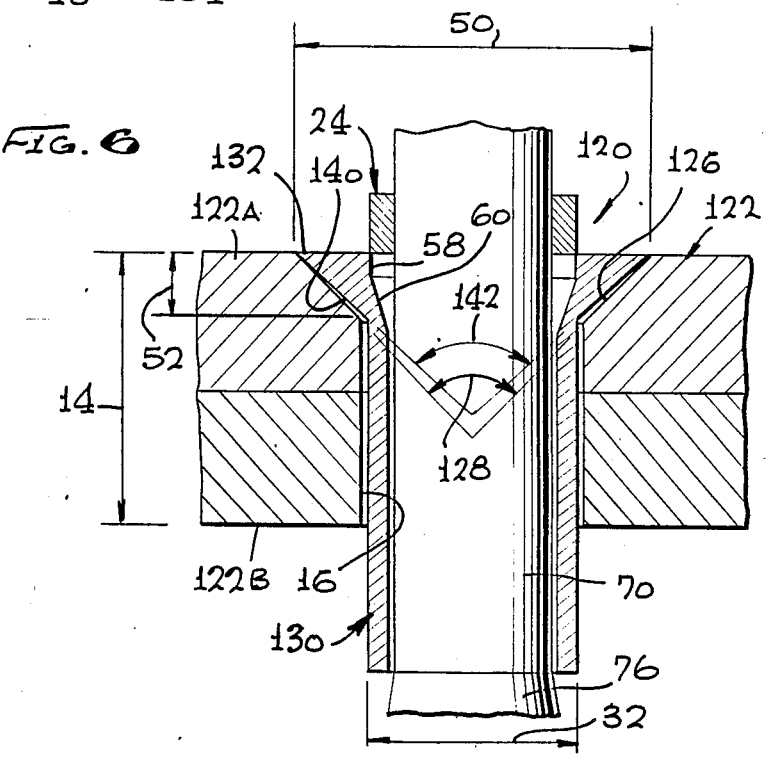

Illustrated in FIG. 6 is a partial cross-sectional view of a flush-head blind fastener version installed in a structure prior to upsetting.

BEST MODE FOR CARRYING OUT THE INVENTION

Illustrated in FIG. 1 is the protruding-head version of the blind fastener, generally designated by numeral 10. The fastener 10 is shown installed in a structure 12 comprising plates 12A and 12B having a total overall thickness indicated by numeral 14. The plates 12A and 12B have a hole 16 therethrough. The fastener 10 is shown installed in the hole 16 and comprises a sleeve 20, a spindle 22, and a locking collar 24. These components of the fastener outwardly appear conventional but as will be subsequently discussed have critical features and/or dimensions which provide the controlled expansion necessary to produce residual hoop compression stresses around the hole when upset.

Still referring to FIG. 1 and additionally to FIG. 2 which is a cross-sectional view of the sleeve 20, it can be seen that the sleeve has a shank portion 30 having an outer diameter 32 a protruding-head portion 33. The outer diameter 32 has a nominal diameter and a tolerance thereof. While it is desirable to have as small a tolerance as possible, economics dictate some tolerance. Thus, the sleeve outer diameter has a minimum allowable dimension and a maximum allowable dimension. The shank portion 30 has an overall length indicated by numeral 34 which includes the thickness 14 of the structure 12, an upset portion 36 extending beyond the structure 12 plus an additional amount to absorb tolerances thereof (not shown). The length 34 of the shank portion 30 is measured from the plane, indicated by numeral 38, formed by the intersection of the shank portion 30 and the protruding-head portion 33. The sleeve has an inner diameter 40 which is between 0.9000 times the minimum sleeve shank outer diameter 32 and 0.9864 times the maximum sleeve shank outer diameter 32. Hereafter, the sleeve shank outer diameter will be called the sleeve outer diameter. The head portion 33 has a diameter 50 which is between 1.8732 times the minimum sleeve outer diameter 32 and 1.8808 times the maximum sleeve outer diameter 32 and a head height 52 of between 0.4211 times the minimum sleeve outer diameter 32 and 0.4663 times the maximum sleeve outer diameter 32.

The head 33 also includes a counterbore 58 having a diameter 59 to accomodate the locking collar 24. A tapered transition portion 60 extends from the counterbore 58 into the sleeve inner diameter 40. Additionally, the underhead surface 62 is sloped downward at an angle 64 of between 5 and 6 degrees.

Illustrated in FIG. 3 is an enlarged view of the spindle 22. Still referring to FIG. 1 and additionally to FIG. 3, it can be seen that the spindle 22 has a stem portion 70 with circular serrations 72 at one end and an overall length 74. The stem portion 70 has a serrated surface 75 for positioning the locking collar 24 (best seen in FIG. 1). A cold work mandrel portion 76 is attached by its first end 80 to the stem portion 70 and has a diameter 82 between 0.8789 times the minimum sleeve outer diameter 32 and 0.8756 times the maximum sleeve outer diameter 32. The second end 84 of the mandrel portion 76 has a diameter 86 which is between 0.9684 times the minimum sleeve outer diameter 32 and 0.9585 times the maximum sleeve outer diameter 32. The overall length 88 of the mandrel portion 76 is between 2.000 times the minimum sleeve outer diameter 32 and 2.1000 times the maximum sleeve outer diameter 32.

A shear pin portion 90 is attached by its first end 92 to the second end 84 of the mandrel portion 76 by means of a small necked down portion 94. This portion 94 is "necked down" to a point that it will break upon application of sufficient tension loads (to be subsequently discussed). Thus, for the connection of the shear pin portion 90 to the mandrel portion 76 is a frangible one. The shear pin portion 90 has a diameter 96 of between 0.9632 times the minimum sleeve outer diameter 32 and 0.9534 times the maximum sleeve outer diameter 32 and a length 98 of between the thickness 14 of the structure 12 plus 0.4211 times the minimum sleeve outer diameter 32 and the length 14 plus 0.4663 times the maximum sleeve outer diameter 32. The second end 92 of the pin portion 90 has a tapered groove 100 for receiving the locking collar 24 in a manner to be subsequently discussed. Attached to the second end 102 of the shear pin portion 90 is a sleeve end upset mandrel 104 having a diameter 106 which is greater than the inner diameter 40 of the sleeve 20 (best seen in FIG. 1).

Still referring to FIG. 1 and FIG. 4, it can be seen that the locking collar 24 has a length 110, an inside diameter 112 and an outside diameter 114. The inside diameter 112 is large enough to fit over the stem portion 70 but small enough to be lightly held in place by serrations 75. The outside diameter 114 is sufficiently small so as to fit into the counterbore 58 of sleeve 20 (again best seen in FIG. 1).

Still referring to FIGS. 1 through 4 and additionally to FIG. 5 which is an illustration of the rivet installed in the hole 16 and upset, joining plates 12A and 12B together. This is accomplished by use of conventional installation tools (not shown) well-known in the prior art. Using this tool, the spindle 22 is pulled upward by grasping of the stem 70. Simultaneously, the head 33 of the sleeve 20 is pressed towards the structure 12. This draws the mandrel portion 76 upward through the inner diameter 40 of the sleeve causing the shank portion 30 to expand in the hole 16. The dimensions of the shank portion 30, hole 16, and mandrel portion 76 are such that the hole is stressed beyond the proportional limit in hoop tension and when the mandrel portion 90 is pulled completely through the hole 16 the material around the hole starts to partially recover elastically and form residual hoop compression locally around the hole.

Continued pulling on the stem portion 70 pulls the shear pin portion into the sleeve inner diameter to the position illustrated in FIG. 5. As this is being accomplished, the mandrel portion 104 engages the end 36 of the sleeve shank 30 deforming it outward. In the position as indicated in FIG. 5, the mandrel portion 104 can no longer move upward. At this point, the locking collar 24 is driven downward into the recess formed by the alignment of the groove 100 on the shear pin portion 90 of the spindle 22 and the counterbore 58 and tapered transition portion 60 of the sleeve 20. Thereafter, continued pulling will now cause the stem 70 to separate from the shear pin portion 90 at the necked down portion 94 therebetween, ending with the installed rivet as illustrated in FIG. 5. Note that the underhead surface 62 now lies flat against the structure 12. While one preferred design of the upset method has been described other design are acceptable. For example, as disclosed in the previously-mentioned prior art U.S. Pat. Nos. 4,219,923 and 4,451,189.

Illustrated in FIG. 6 is a partial cross-sectional view of a flush-head fastener design generally indicated by numeral 120. The flush-head fastener is quite similar to the protruding-head fastener and thus all similar parts are identified with the same numerals. Here the structure 122 being joined comprises plates 122A and 122B having a hole 16 therethrough. However, a portion of the hole 16 through plate 122A is countersunk, indicated by numeral 126 at an included angle of 128 of between 99 to 101 degrees. In the flush-head fastener 120 the sleeve 130 is similar to the sleeve 20 in the protruding-head design 10 illustrated in FIGS. 1–5. Except that the head portion 132 is a flush-head having the same height 52 of between 0.4211 times the minimum sleeve outer diameter 32 and 0.4663 times the maximum sleeve outer diameter 32 and further the head diameter 50 is between 1.8732 times the minimum sleeve outer diameter 32 and 1.888 times the maximum sleeve outer diameter 32. The underhead surface 140 has an included angle 142 of between 103 and 104 degrees. All other dimensions of the sleeve are identical as well as the spindle 22 and locking collar 24 as well as the hole 16.

While the invention has been described with reference to particular embodiments, it should be understood that the embodiments are merely illustrative as there are numerous variations and modifications which may be made by those skilled in the art. Thus, the invention is to be construed as being limited only by the spirit and scope of the appended claims.

INDUSTRIAL APPLICABILITY

This blind fastener design is useful for joining structures together and, in particular, aircraft structures.

We claim:

1. A blind fastener for joining adjacent structural elements together, the structural elements having at least one aligned hole of a predetermined diameter for receiving the fastener, the fastener including:
    a hollow tubular sleeve including;
        a shank portion having an outer diameter with a minimum and maximum allowable value;
        an inner diameter of betweeen 0.9000 times the minimum sleeve outer diameter and 0.8964 times the maximum sleeve outer diameter; and
        a head portion for abutting against one side of the adjacent structural elements at one end of said shank portion and an opposite end for extending beyond the other side of the structural elements;
    a spindle including;
        a stem portion having a diameter equal to or less than said inner diameter of said sleeve for pulling said spindle partially through said sleeve;
        a cold work mandrel portion for expanding said sleeve when drawn through said inner diameter, said mandrel portion having first and second ends with said first end attached to said stem portion said mandrel portion further having an increasing taper from said first end to said second end with said first end of said mandrel portion having a diameter between 0.8789 times said minimum sleeve outer diameter and 0.8756 times the maximum sleeve outer diameter and said second end of said mandrel portion having a diameter between 0.9684 times the minimum sleeve outer diameter and 0.9585 times the maximum sleeve outer diameter and a length of between 2.000 times the minimum sleeve outer diameter and 2.1000 times the maximum sleeve outer diameter;
        a shear pin portion having first and second ends, and a diameter between 0.9632 times the minimum sleeve outer diameter and 0.9534 times the maximum sleeve outer diameter, said first end of said shear pin portion frangibly attached to said second end of said mandrel portion;
        a sleeve expanding portion attached to said second end of said shear pin portion for expanding said opposite end of said sleeve when said spindle is partially drawn through said inner diameter; and
    locking means for locking said shear pin portion to said sleeve when said spindle has been drawn partially through said sleeve.

2. The fastener as set forth in claim 1 wherein:
    the height of said head portion is between 0.42111 times the minimum sleeve outer diameter and 0.4663 times the maximum sleeve outer diameter; and
    the diameter of said head portion is between 1.8732 times the minimum sleeve outer diameter and 1.8808 times the maximum sleeve outer diameter.

3. The fastener as set forth in claim 2 wherein the hole has a diameter between the maximum sleeve outer diameter and 1.0155 times the maximum sleeve outer diameter.

4. The fastener as set forth in claim 3 wherein said rivet has a protruding-head.

5. The fastener as set forth in claim 3 wherein the hole is counter-sunk on the one side and said rivet is a flush-head rivet.

* * * * *